United States Patent
Ruepp et al.

(10) Patent No.: US 11,562,560 B1
(45) Date of Patent: Jan. 24, 2023

(54) NORMAL ESTIMATION FOR A PLANAR SURFACE

(71) Applicant: Apple Inc., Cupertino, CA (US)

(72) Inventors: Oliver Thomas Ruepp, Baierbrunn (DE); Pedro Antonio Pinies Rodriguez, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 71 days.

(21) Appl. No.: 17/148,789

(22) Filed: Jan. 14, 2021

Related U.S. Application Data

(60) Provisional application No. 63/000,068, filed on Mar. 26, 2020.

(51) Int. Cl.
  *G06V 20/00* (2022.01)
  *G01V 7/00* (2006.01)
  *G06T 7/73* (2017.01)

(52) U.S. Cl.
  CPC .............. *G06V 20/00* (2022.01); *G01V 7/00* (2013.01); *G06T 7/73* (2017.01)

(58) Field of Classification Search
  CPC ............. G06V 20/00; G06T 7/73; G01V 7/00
  See application file for complete search history.

(56) References Cited

U.S. PATENT DOCUMENTS

| | | | | |
|---|---|---|---|---|
| 9,858,683 | B2 * | 1/2018 | Liu | H04N 13/271 |
| 10,089,750 | B2 * | 10/2018 | Ho | G06T 7/593 |
| 10,438,405 | B2 * | 10/2019 | Ni | G06T 17/00 |
| 11,030,474 | B1 * | 6/2021 | Buchaca | G06T 19/20 |
| 11,057,612 | B1 * | 7/2021 | Clemens | H04N 13/279 |
| 2013/0120375 | A1 * | 5/2013 | Jin | G06T 19/00 345/420 |
| 2015/0245020 | A1 * | 8/2015 | Meier | G06T 7/80 348/135 |
| 2021/0181747 | A1 * | 6/2021 | Hu | G05D 1/0246 |

* cited by examiner

*Primary Examiner* — Pinalben Patel
(74) *Attorney, Agent, or Firm* — Fernando & Partners, LLP

(57) ABSTRACT

Various implementations disclosed herein include devices, systems, and methods for normal estimation using a directional measurement, such as a gravity vector. In various implementations, a device includes a non-transitory memory and one or more processors coupled with the non-transitory memory. In some implementations, a method includes identifying planar surfaces in an environment represented by an image. Each planar surface is associated with a respective orientation. A directional vector associated with the environment is determined. A subset of the planar surfaces that have a threshold orientation relative to the directional vector is identified. For each planar surface in the subset of the planar surfaces, a normal vector for the planar surface is determined based on the orientation of the planar surface and the directional vector.

24 Claims, 7 Drawing Sheets

NORMAL ESTIMATION FOR A PLANAR SURFACE

CROSS-REFERENCE TO RELATED APPLICATION

This application claims the benefit of U.S. Provisional Patent App. No. 63/000,068, filed on Mar. 26, 2020, which is incorporated by reference in its entirety.

TECHNICAL FIELD

The present disclosure generally relates to normal estimation for a planar surface.

BACKGROUND

Normal estimation continues to be of interest in machine vision. For example, normal information may be used, e.g., with semantic class information, to identify objects in an environment. Normal information is also used in depth estimation. Normal estimation tends to be a resource-intensive operation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
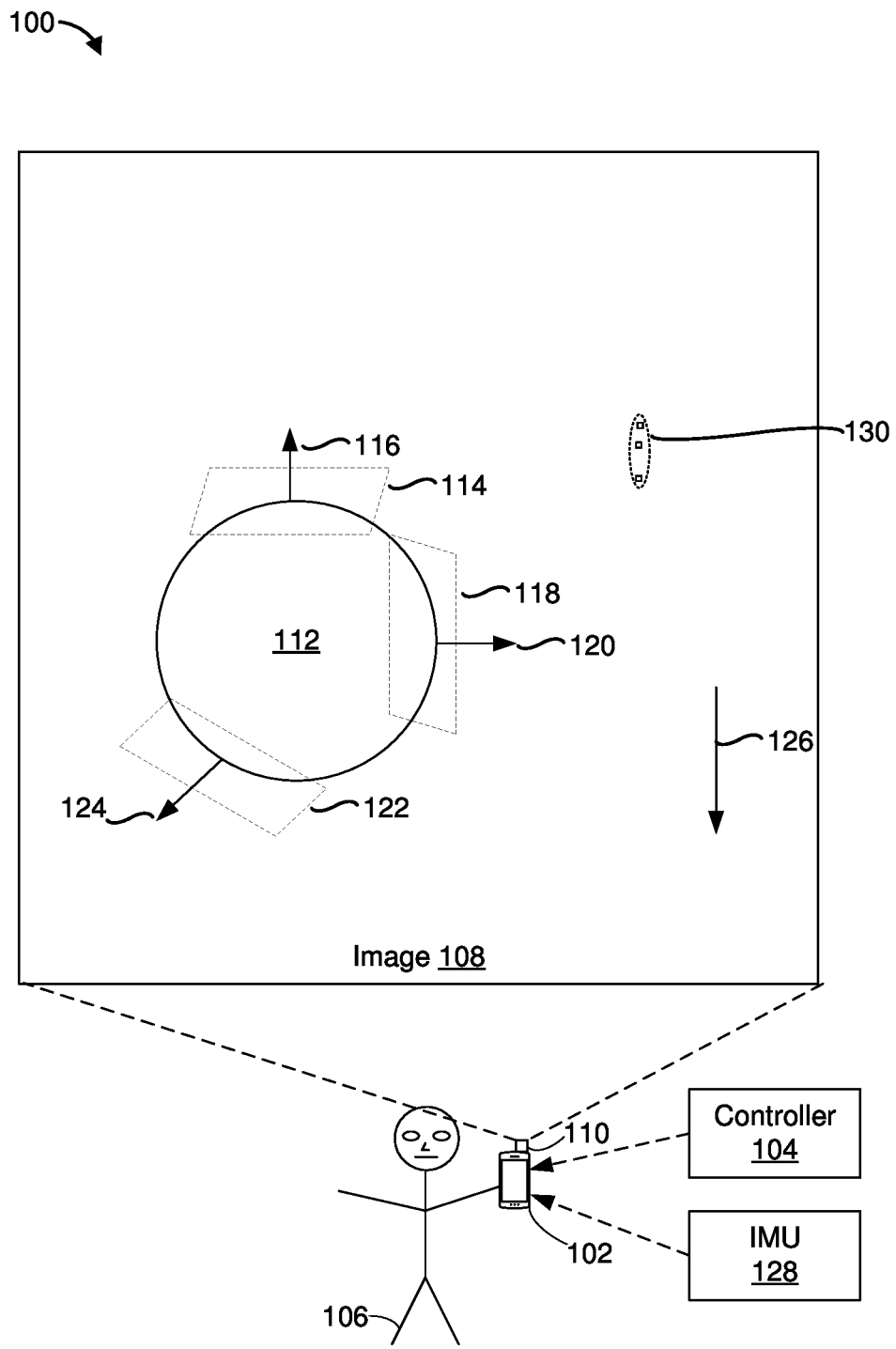
FIG. 1 illustrates an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for normal estimation using a directional measurement, such as a gravity vector. In various implementations, a device includes a non-transitory memory and one or more processors coupled with the non-transitory memory. In some implementations, a method includes identifying planar surfaces in an environment represented by an image. Each planar surface is associated with a respective orientation. In some implementations, the method includes determining a directional vector associated with the environment. In some implementations, the method includes identifying a subset of the planar surfaces that have a threshold orientation relative to the directional vector. For each planar surface in the subset of the planar surfaces, a normal vector for the planar surface is determined based on the orientation of the planar surface and the directional vector.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some machine vision systems perform normal estimation (e.g., determine a vector that is normal to a surface) for a variety of purposes. For example, normal information and semantic class information may be used in a region growing algorithm to identify physical articles in a physical environment. Normal information may also be used for depth estimation. Some machine vision systems perform normal estimation on a pixel-by-pixel basis. However, performing normal estimation in this way can be computationally expensive and can be prone to error.

The present disclosure provides methods, systems, and/or devices for normal estimation using a directional measurement, such as a gravity vector. In various implementations, a device includes a non-transitory memory and one or more processors coupled with the non-transitory memory. In some implementations, a method includes identifying planar surfaces in an environment (e.g., a physical environment or an XR environment) represented by an image. Each planar surface is associated with a respective orientation. A directional vector (e.g., a gravity vector) associated with the environment is determined. In some implementations, the method includes identifying a subset of the planar surfaces that have a threshold orientation relative to the directional vector. For example, planar surfaces that are parallel to or orthogonal to the directional vector may be identified. In some implementations, the method includes determining a normal vector for each such planar surface based on the orientation of the planar surface and the directional vector. In some implementations, if a planar surface is horizontal, the normal vector is determined to be aligned with the direction of gravity. On the other hand, if a planar surface is vertical, the normal vector may be determined to be orthogonal to the direction of gravity. In some implementations, using a directional vector, such as a gravity vector, to determine the normal vector for certain surfaces, reduces the number of surfaces for which computationally intensive normal estimation techniques are used. For example, determining normal vectors for horizontal and vertical surfaces based on the directional vector (e.g., based on the gravity vector) reduces the need to determine the normal vectors for horizontal and vertical surfaces on a pixel-by-pixel basis thereby reducing a utilization of computing resources. Reducing the utilization of computing resources tends to enhance an operability of a battery-operated device by extending a battery life of the battery-operated device. Reducing the utilization of computing resources tends to improve an operational efficiency of a device by reducing an amount of heat that the device generates.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102 and a controller 104. In some implementations, the electronic device 102 is or includes a smartphone, a tablet, a laptop computer, and/or a desktop computer. The electronic device 102 may be worn by or carried by a user 106.

As illustrated in FIG. 1, in some implementations, the electronic device 102 and/or the controller 104 obtains an image 108 that corresponds to a physical environment. In some implementations, the image 108 corresponds to an XR environment. In some implementations, the image 108 is captured by an image sensor, such as a camera 110 associated with the electronic device 102 and/or the controller 104. In some implementations, the image 108 is obtained from another device that is in communication with the electronic device 102 and/or the controller 104.

In some implementations, the image 108 is a still image. In some implementations, the image 108 is an image frame forming part of a video feed. The image 108 includes a plurality of pixels. Pixels in the image 108 may correspond to features in a physical environment. For example, a set of pixels in the image 108 may correspond to an object 112 in the physical environment.

In some implementations, the physical environment has one or more planar surfaces. For example, the object 112 may have multiple planar surfaces, and each planar surface may be associated with a respective normal vector. A planar surface 114 may be associated with a normal vector 116 that is orthogonal to the planar surface 114. A planar surface 118 may be associated with a normal vector 120 that is orthogonal to the planar surface 118. A planar surface 122 may be associated with a normal vector 124 that is orthogonal to the planar surface 122.

In some implementations, the electronic device 102 and/or the controller 104 identifies one or more of the planar surfaces in the physical environment. For example, the electronic device 102 and/or the controller 104 may identify the planar surface 114, the planar surface 118, and/or the planar surface 122. In some implementations, the planar surfaces 114, 118, and 122 correspond with respective sets of pixels in the image 108.

In some implementations, the electronic device 102 and/or the controller 104 determines a directional vector 126 that is associated with the physical environment. The directional vector 126 may be a gravity vector. In some implementations, the electronic device 102 and/or the controller 104 includes an inertial measurement unit (IMU) 128. In some implementations, a gravity measurement is derived from the IMU 128. The electronic device 102 and/or the controller 104 may synthesize the directional vector 126 (e.g., a gravity vector) based on the gravity measurement.

In some implementations, the electronic device 102 and/or the controller 104 determines the directional vector 126 based on one or more spatial lines in the physical environment. For example, the electronic device 102 and/or the controller 104 may derive a gravity measurement from the image 108. In some implementations, the image 108 includes a set of pixels 130, e.g., a line, that corresponds to a vertical line in the physical environment, such as a portion of a window or a door. In some implementations, the directional vector 126 (e.g., the direction of gravity) is determined based on (e.g., inferred from) the orientation of the vertical line. As another example, the directional vector 126 may be determined based on an orientation of a physical article, e.g., a window or a door, that is represented by the set of pixels 130. In some implementations, the image 108 includes a set of pixels that corresponds to a horizontal line in the physical environment, and the directional vector 126 is determined based on (e.g., inferred from) the orientation of the horizontal line.

In some implementations, the electronic device 102 and/or the controller 104 identifies a subset of the planar surfaces that have a threshold orientation relative to the directional vector 126. For example, the electronic device 102 and/or the controller 104 may identify planar surfaces that are parallel to the directional vector 126, such as the planar surface 118. The electronic device 102 and/or the controller 104 may identify planar surfaces, such as the planar surface 114, that are orthogonal to the directional vector 126. It will be appreciated that the physical environment may include multiple surfaces that are parallel to the directional vector 126 and/or multiple surfaces that are orthogonal to the directional vector 126.

In some implementations, for each planar surface that was identified, the electronic device 102 and/or the controller 104 determines a normal vector for the planar surface based on the orientation of the planar surface and the directional vector 126. For example, in the case of a planar surface that is parallel to the directional vector 126, such as the planar surface 118, the electronic device 102 and/or the controller 104 may determine that the normal vector 120 is orthogonal to the directional vector 126. In the case of a planar surface that is orthogonal to the directional vector 126, such as the planar surface 114, the electronic device 102 and/or the controller 104 may determine that the normal vector 116 is parallel to the directional vector 126.

It will be appreciated that some planar surfaces in the physical environment, such as the planar surface 122, are neither parallel to the directional vector 126 nor orthogonal to the directional vector 126. In some implementations, the electronic device 102 and/or the controller 104 uses another normal estimation technique (e.g., pixel-by-pixel analysis) to determine the normal vector, e.g., the normal vector 124, for such planar surfaces.

In some implementations, the electronic device 102 is replaced by or is attached to a head-mountable device (HMD) worn by the user 106. The HMD presents (e.g., displays) an XR environment according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 102 can be attached to the head-mountable enclosure. In various implementations, the head-mountable enclosure is shaped to form a receptacle for receiving another device that includes a display (e.g., the electronic device 102). For example, in some implementations, the electronic device 102 slides/snaps into or otherwise attaches to the head-mountable enclosure. In some implementations, the display of the device attached to the head-mountable enclosure presents (e.g., displays) the XR environment. In various implementations, examples of the electronic device 102 include smartphones, tablets, media players, laptops, etc.

Figure 2:
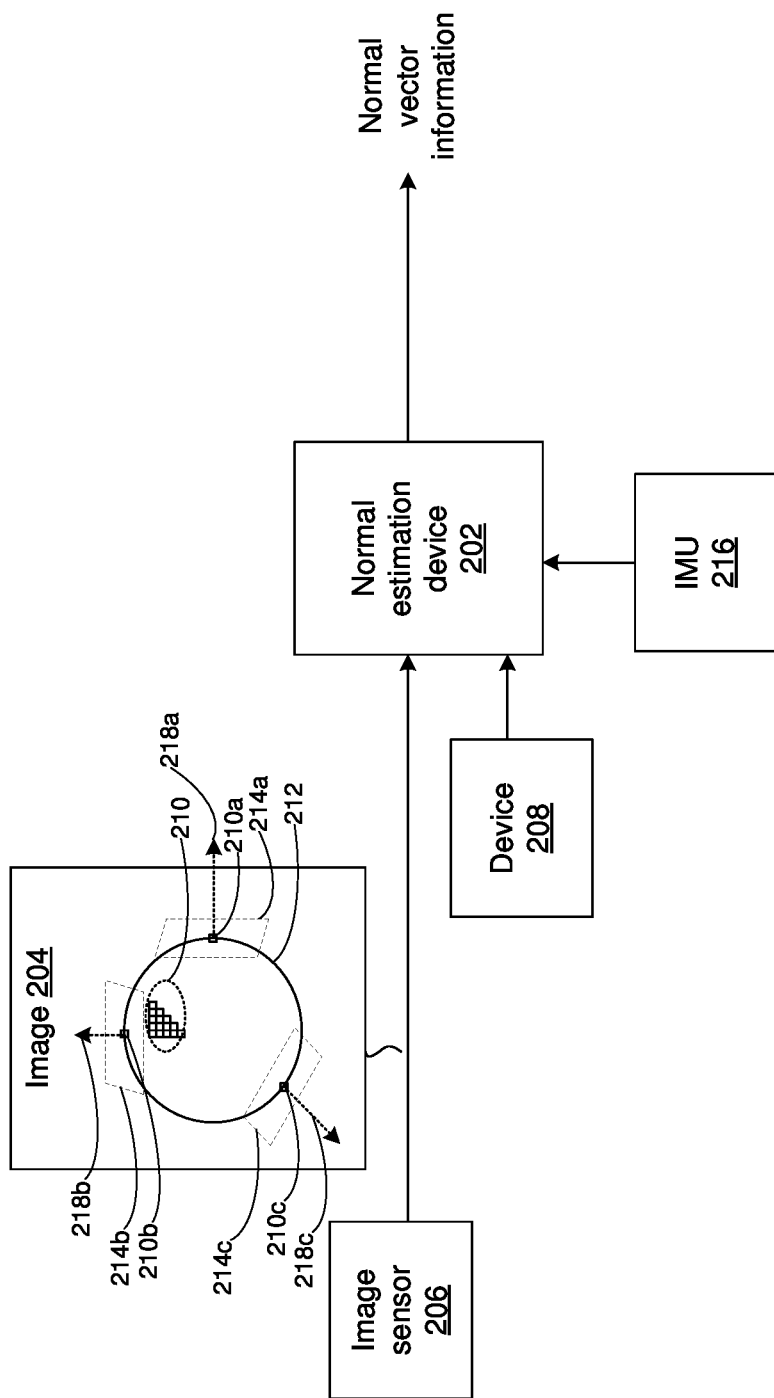
FIG. 2 illustrates an example system that performs normal estimation according to various implementations

FIG. 2 illustrates an example system 200 that performs normal estimation according to various implementations. In some implementations, a normal estimation device 202 obtains an image 204. The normal estimation device 202 may obtain the image 204 from an image sensor 206 or other component of a device in which the normal estimation device 202 is integrated, such as, for example, the electronic device 102 of FIG. 1. In some implementations, the normal estimation device 202 obtains the image 204 from a device 208 that is external to a device in which the normal estimation device 202 is integrated. For example, if the normal estimation device 202 is integrated in the electronic device 102 of FIG. 1, the normal estimation device 202 may obtain the image 204 from another electronic device with which the electronic device 102 is in communication.

The image 204 comprises a plurality of pixels 210. The pixels 210 may correspond to features in a physical environment. For example, a set of pixels in the image 204 may correspond to an object 212 in the physical environment. In some implementations, the normal estimation device 202 performs semantic segmentation and/or instance segmentation on the image 204 to distinguish the pixels corresponding to the object 212 from pixels corresponding to a background, e.g., pixels not corresponding to the object 212.

Some pixels correspond to a boundary between the object 212 and the background. For example, the normal estimation device 202 may determine that pixels 210a, 210b, and 210c correspond to the boundary of the object 212. In some implementations, the normal estimation device 202 identifies planar surfaces in the physical environment. The identified planar surfaces may be associated with pixels that correspond to the boundary of the object 212. For example, planar surfaces 214a, 214b, and 214c may be associated with the pixels 210a, 210b, and 210c, respectively.

In some implementations, the normal estimation device 202 determines a directional vector, such as a gravity vector, that is associated with the physical environment. In some implementations, an IMU 216 provides a gravity measurement to the normal estimation device 202. The normal estimation device 202 may synthesize the gravity vector based on the gravity measurement.

In some implementations, the normal estimation device 202 determines the directional vector based on one or more spatial lines, such as a vertical line, in the physical environment. For example, the normal estimation device 202 may identify a set of pixels in the image 204 that corresponds to a vertical line or a horizontal line in the physical environment. Semantic segmentation and/or instance segmentation may be applied to associate the identified set of pixels with an object type (e.g., a door). The normal estimation device 202 may determine an orientation of the line based on the object type. For example, if the normal estimation device 202 associates the identified set of pixels with a door, the normal estimation device 202 may determine that the identified set of pixels corresponds to a vertical line. On the other hand, if the normal estimation device 202 instead associates the identified set of pixels with a tabletop, the normal estimation device 202 may determine that the identified set of pixels corresponds to a horizontal line. In some implementations, the normal estimation device 202 determines the directional vector based on the orientation of the line.

In some implementations, the normal estimation device 202 identifies a subset of the planar surfaces that have a threshold orientation relative to the directional vector. For each such planar surface having the threshold orientation, the normal estimation device 202 may determine a normal vector based on the orientation of the planar surface and the directional vector.

For example, the normal estimation device 202 may identify planar surfaces that are parallel to the directional vector. If the directional vector is a gravity vector, the planar surface 214a may be parallel to the gravity vector. In some implementations, the normal estimation device 202 determines that a normal vector 218a extends from the pixel 210a in a direction orthogonal to the gravity vector and outward from the object 212.

As another example, the normal estimation device 202 may identify planar surfaces that are orthogonal to the directional vector. If the directional vector is a gravity vector, for example, the planar surface 214b may be orthogonal to the gravity vector. In some implementations, the normal estimation device 202 determines that a normal vector 218b extends from the pixel 210b in a direction parallel to the gravity vector and outward from the object 212.

In some implementations, the normal estimation device 202 identifies planar surfaces that are neither parallel to nor orthogonal to the directional vector. For example, if the directional vector is a gravity vector, the planar surface 214c may be neither parallel to nor orthogonal to the gravity vector. In some implementations, the normal estimation device 202 uses another normal estimation technique to determine a normal vector 218c that extends from the pixel 210c outward from the object 212.

In various implementations, the normal estimation device 202 performs a first normal estimation operation for planar surfaces that are either parallel to or orthogonal to the directional vector. In some implementations, the first normal estimation operation utilizes a first amount of computing resources. In some implementations, performing the first normal estimation operation includes determining that a planar surface is parallel to the directional vector, and assigning the planar surface a normal vector that is orthogonal to the directional vector. In some implementations, performing the first normal estimation operation includes determining that a planar surface is orthogonal to the directional vector, and assigning the planar surface a normal vector that is parallel to the directional vector. In various implementations, the normal estimation device 202 performs a second normal estimation operation for planar surfaces that are neither parallel to nor orthogonal to the directional vector. In some implementations, the second normal estimation operation utilizes a second amount of computing resources that is greater than the first amount of computing resources. The second normal estimation operation is different from the first normal estimation operation.

In some implementations, the second normal estimation operation includes performing a pixel-by-pixel analysis of the planar surface.

Figure 3:
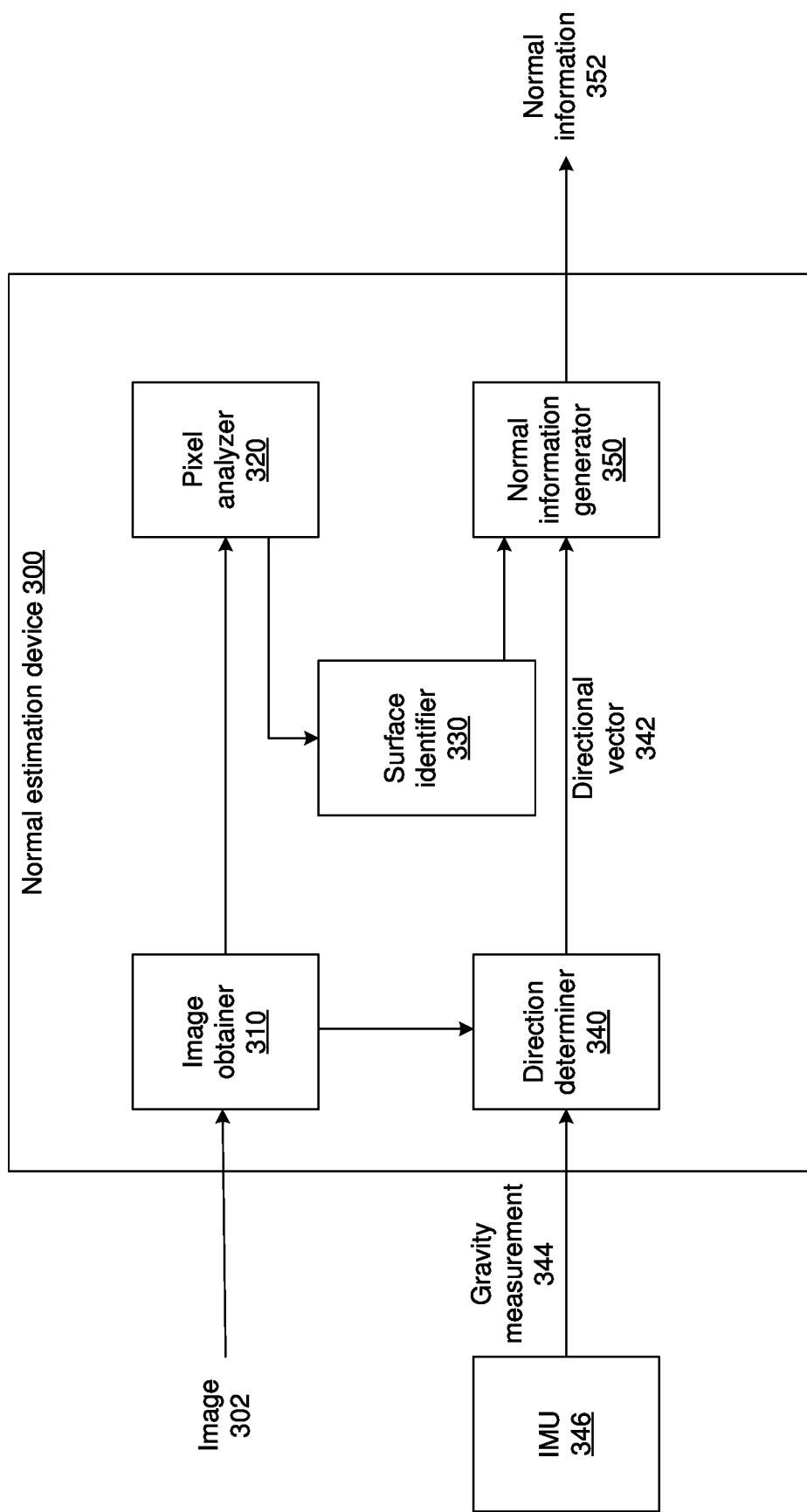
FIG. 3 is a block diagram of an example normal estimation device in accordance with some implementations

FIG. 3 is a block diagram of an example normal estimation device 300 in accordance with some implementations. In some implementations, the normal estimation device 300 implements the normal estimation device 202 shown in FIG. 2. In some implementations, the normal estimation device 300 obtains an image 302.

In some implementations, an image obtainer 310 obtains the image 302. The image obtainer 310 may obtain the image 302 from a component of a device in which the normal estimation device 300 is integrated. For example, if the normal estimation device 300 is integrated in the electronic device 102 of FIG. 1, the electronic device 102 may have an image sensor, such as a camera, that may capture the image 302 and provide the image 302 to the image obtainer 310. In some implementations, the image obtainer 310 obtains the image 302 from another device. For example, if the normal estimation device 300 is integrated in the electronic device 102 of FIG. 1, the image obtainer 310 may obtain the image 302 from a device with which the electronic device 102 is in communication.

In some implementations, the image 302 comprises a plurality of pixels. The pixels may correspond to features in a physical environment. For example, a set of pixels in the image 302 may correspond to an object in the physical environment. In some implementations, a pixel analyzer 320 performs semantic segmentation and/or instance segmentation on the image 302 to distinguish the pixels corresponding to the object from pixels corresponding to a background, e.g., pixels not corresponding to the object.

In some implementations, a surface identifier 330 identifies planar surfaces in the physical environment. For example, the pixel analyzer 320 may identify pixels that correspond to a boundary of the object. In some implementations, the pixel analyzer 320 uses an edge detection technique, e.g., an edge-aware image filter, to determine the boundary of the object. The surface identifier 330 may identify planar surfaces that are associated with pixels corresponding to the boundary of the object.

Each planar surface is associated with a respective orientation. Some planar surfaces have a horizontal orientation, e.g., orthogonal to a direction of gravity. Other planar surfaces have a vertical orientation, e.g., parallel to the direction of gravity. Still other planar surfaces have an orientation that is neither horizontal nor vertical.

Each planar surface is also associated with a respective normal vector that is orthogonal to the planar surface. For example, a planar surface with a horizontal orientation has a normal vector that has a vertical orientation. A planar surface with a vertical orientation has a normal vector that has a horizontal orientation. A planar surface that has an orientation that is neither horizontal nor vertical has a normal vector with an orientation that is neither horizontal nor vertical.

In some implementations, the normal estimation device 300 determines the normal vector for a planar surface based on the orientation of the planar surface and on a directional vector, such as a gravity vector. For example, in some implementations, a direction determiner 340 determines a directional vector 342 that is associated with the physical environment. The direction determiner 340 may determine the directional vector 342 based on a gravity measurement 344 from an IMU 346. The direction determiner 340 may synthesize the directional vector 342 based on the gravity measurement 344.

In some implementations, the direction determiner 340 determines the directional vector 342 based on one or more spatial lines, such as a vertical line, in the physical environment. For example, the pixel analyzer 320 may identify a set of pixels in the image 302 that corresponds to a vertical line or a horizontal line in the physical environment. The pixel analyzer 320 may perform semantic segmentation and/or instance segmentation on the image 302 to associate the identified set of pixels with an object type (e.g., a door). In some implementations, the pixel analyzer 320 determines an orientation of the line based on the object type. For example, if the identified set of pixels is associated with a door, the pixel analyzer 320 may determine that the identified set of pixels corresponds to a vertical line. On the other hand, if the identified set of pixels is instead associated with a tabletop, the pixel analyzer 320 may determine that the identified set of pixels corresponds to a horizontal line.

In some implementations, the direction determiner 340 determines the directional vector 342 based on the orientation of the line. For example, if the pixel analyzer 320 determines that the line is vertical, the direction determiner 340 may determine that the directional vector 342 is parallel to the line. On the other hand, if the pixel analyzer 320 determines that the line is horizontal, the direction determiner 340 may determine that the directional vector 342 is orthogonal to the line.

In some implementations, the normal estimation device 300 reduces the number of planar surfaces for which potentially computationally expensive and/or error-prone normal estimation techniques are used to determine normal vectors. For example, a normal information generator 350 may identify a subset of the planar surfaces that have a threshold orientation relative to the directional vector 342. For each such planar surface having the threshold orientation, the normal information generator 350 may determine normal information 352 (e.g., a normal vector) based on the orientation of the planar surface and the directional vector 342. For example, the normal information generator may identify planar surfaces that are parallel to the directional vector and determine that such planar surfaces have normal vectors that are orthogonal to the directional vector 342. As another example, the normal information generator 350 may identify planar surfaces that are orthogonal to the directional vector and determine that such planar surfaces have normal vectors that are parallel to the gravity vector.

In some implementations, the normal information generator 350 identifies planar surfaces that are neither parallel to nor orthogonal to the directional vector. The normal information generator 350 may use another normal estimation technique to determine normal information 352 (e.g., a normal vector) for such planar surfaces.

Figure 4A:
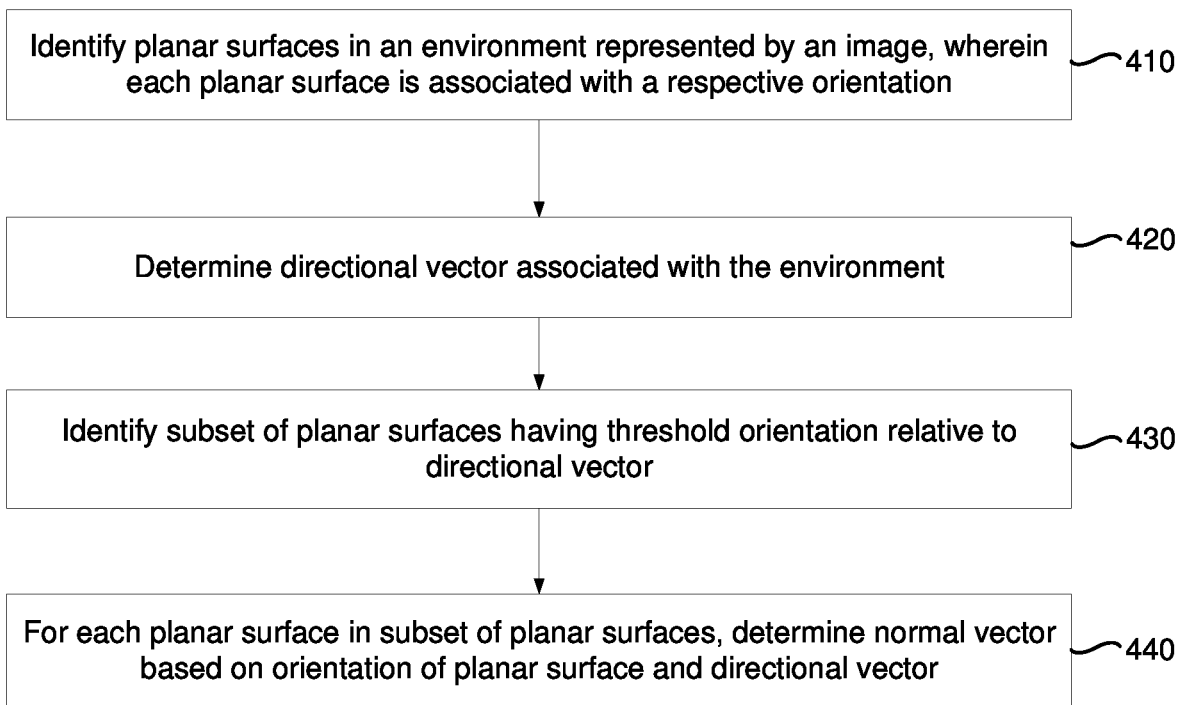
FIGS. 4A-4C are a flowchart representation of a method for performing normal estimation in accordance with some implementations
Figure 4B:
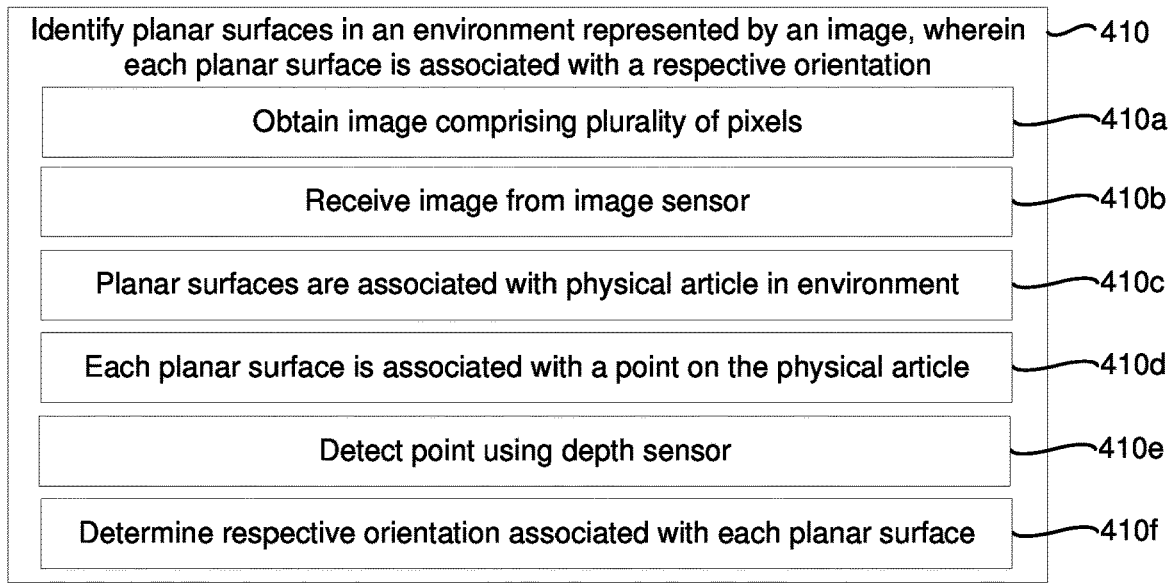
Figure 4B:
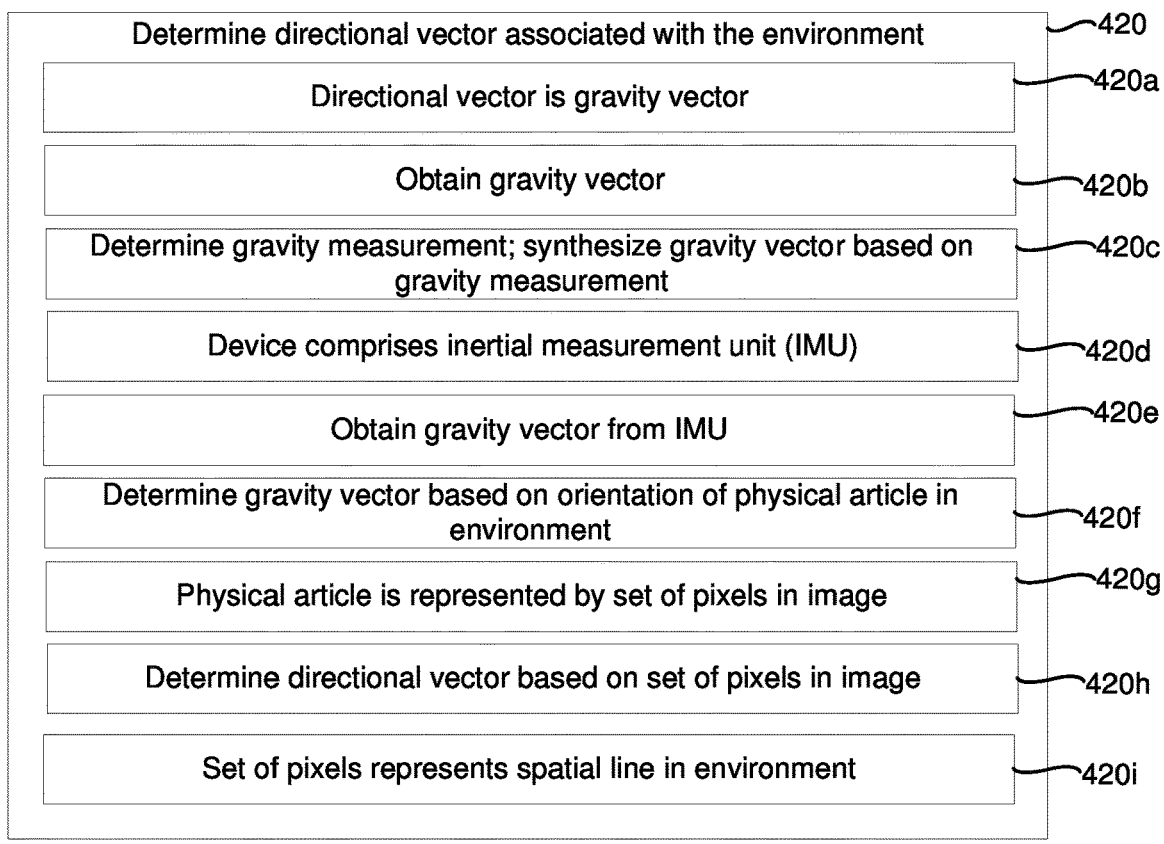
Figure 4C:
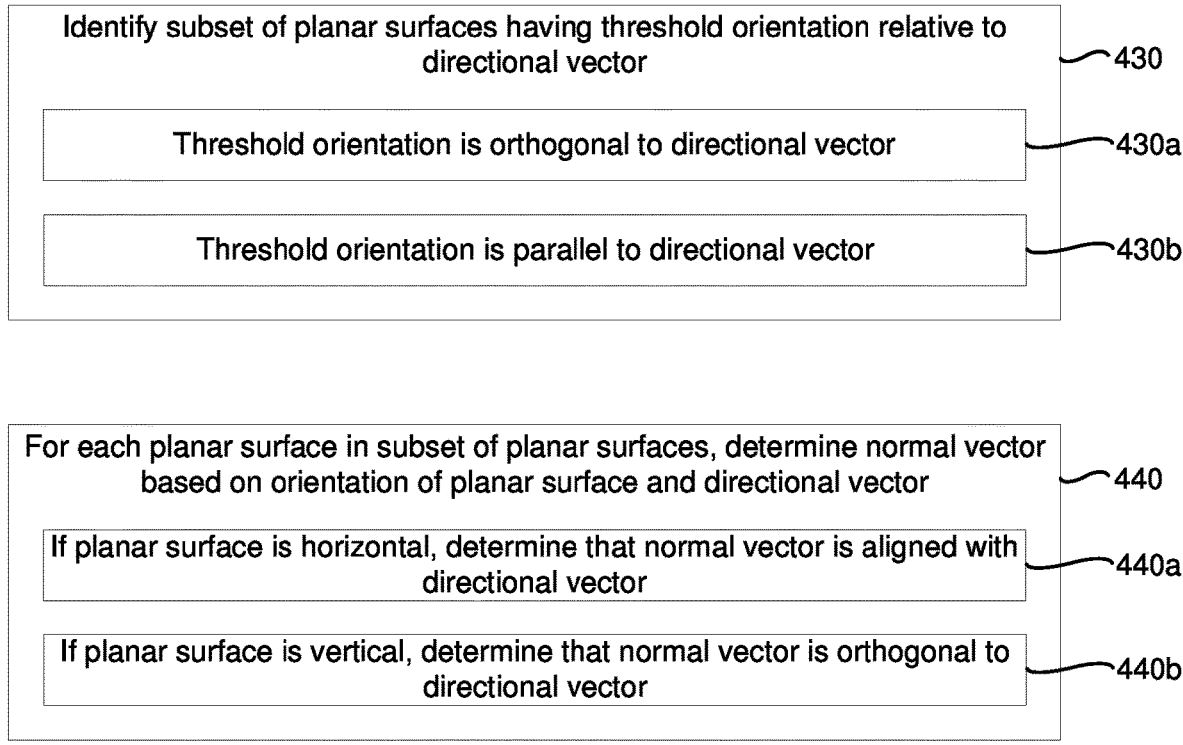

FIGS. 4A-4C are a flowchart representation of a method 400 for performing normal estimation in accordance with some implementations. In various implementations, the method 400 is performed by a device (e.g., the electronic device 102 and/or the controller 104 shown in FIG. 1, and/or the system 200 shown in FIG. 2). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes identifying planar surfaces in an environment represented by an image, determining a directional vector associated with the environment, identifying planar surfaces that have a threshold orientation relative to the directional vector, and, for each such planar surface, determining a normal vector based on the orientation of the planar surface and the directional vector.

As represented by block 410, in various implementations, the method 400 includes identifying planar surfaces in an environment represented by an image. Each planar surface is associated with a respective orientation. Referring now to FIG. 4B, as represented by block 410*a*, in some implementations, the method 400 includes obtaining the image, which includes a plurality of pixels. As represented by block 410*b*, the image may be obtained from an image sensor, such as a camera associated with the electronic device 102 of FIG. 1. In some implementations, the system 200 applies semantic segmentation and/or instance segmentation to identify pixels that correspond to an object in the environment.

As represented by block 410*c*, the planar surfaces may be associated with a physical article in the environment, such as the object corresponding to the set of pixels. As represented by block 410*d*, each planar surface may be associated with a point on the physical article. For example, certain pixels may be associated with a boundary of the physical article (e.g., between the physical article and the background), and planar surfaces may be associated with points on the physical article that correspond with those pixels. As represented by block 410*e*, in some implementations, the point on the physical article may be detected using a depth sensor.

In some implementations, as represented by block 410*f*, the method 400 includes determining the respective orientation associated with each planar surface. For example, when a directional vector has been determined, the system 200 may classify the orientations of each planar surface relative to the directional vector as parallel to the directional vector, orthogonal to the directional vector, or neither parallel to nor orthogonal to the directional vector. In some implementations, the system 200 determines the orientations of the planar surfaces without reference to the directional vector.

As represented by block 420, in various implementations, the method 400 includes determining a directional vector associated with the environment. As represented by block 420*a*, in some implementations, the directional vector is a gravity vector. In some implementations, as represented by block 420*b*, the system 200 obtains the gravity vector. As represented by block 420*c*, the system 200 may obtain the gravity vector by determining a gravity measurement and synthesizing the gravity vector based on the gravity measurement.

In some implementations, as represented by block 420*d*, the system 200 includes an IMU. As represented by block 420*e*, the system 200 may obtain the gravity vector from the IMU. For example, the system 200 may obtain a gravity measurement from the IMU and determine the gravity vector based on the gravity measurement.

In some implementations, as represented by block 420*f*, the method 400 includes determining the gravity vector based on an orientation of a physical article in the environment, such as a door or a tabletop. As represented by block 420*g*, the physical article may be represented by a set of pixels in the image. The system 200 may apply semantic segmentation and/or instance segmentation to associate the set of pixels with an object type (e.g., a door). The system 200 may determine the gravity vector based on the object type. For example, if the physical article is a door, the system 200 may determine that the gravity vector is parallel to the set of pixels representing the door. On the other hand, if the physical article is a tabletop, the system 200 may determine that the gravity vector is orthogonal to the set of pixels representing the tabletop.

In some implementations, as represented by block 420h, the method 400 includes determining the directional vector based on a set of pixels in the image. As represented by block 420i, the set of pixels may represent a spatial line in the environment. For example, the set of pixels may represent a vertical line in the environment. In some implementations, the system 200 determines the directional vector based on the orientation of the line. For example, if the line is vertical, the system 200 determines that the directional vector is parallel to the line. On the other hand, if the line is horizontal, the system 200 determines that the directional vector is orthogonal to the line.

As represented by block 430, in various implementations, the method 400 includes identifying a subset of the planar surfaces that have a threshold orientation relative to the directional vector. Referring now to FIG. 4C, in some implementations, as represented by block 430a, the threshold orientation is parallel to the directional vector. For example, if the directional vector is a gravity vector, the system 200 may identify a subset of the planar surfaces that have a vertical orientation. As represented by block 430b, in some implementations, the threshold orientation is orthogonal to the directional vector. For example, if the directional vector is a gravity vector, the system 200 may identify a subset of the planar surfaces that have a horizontal orientation. In some implementations, the system 200 identifies at least two subsets of planar surfaces, e.g., a first subset of planar surfaces having a horizontal orientation and a second subset of planar surfaces having a vertical orientation. In some implementations, the system 200 identifies another subset of planar surfaces having neither a horizontal orientation nor a vertical orientation, e.g., planar surfaces that are neither parallel to nor orthogonal to the directional vector.

As represented by block 440, in various implementations, the method 400 includes determining, for each planar surface in the subset of planar surfaces, a normal vector for the planar surface based on the orientation of the planar surface and the directional vector. In some implementations, as represented by block 440a, on a condition that a planar surface is horizontal, the system 200 determines that the normal vector is aligned with (e.g., parallel to) the directional vector (e.g., the normal vector is vertical). For example, the normal vector may originate from the planar surface and extend outward from an object associated with the planar surface in a direction parallel to the directional vector, e.g., in a vertical direction. In some implementations, as represented by block 440b, on a condition that a planar surface is vertical, the system 200 determines that the normal vector is orthogonal to (e.g., perpendicular to) the directional vector (e.g., normal vector is horizontal). For example, the normal vector may originate from the planar surface and extend outward from an object associated with the planar surface in a direction orthogonal to the directional vector, e.g., in a horizontal direction. In some implementations, the system 200 identifies planar surfaces that are neither parallel to nor orthogonal to the directional vector. The system 200 may use another normal estimation technique to determine the normal vector for such planar surfaces.

Using a directional vector, such as a gravity vector, to determine a normal vector may reduce the number of planar surfaces for which potentially computationally expensive and/or error-prone normal estimation techniques are used to determine normal vectors. Accordingly, computational resources may be used for other tasks. Assigning a normal vector to a planar surface that has a threshold orientation relative to the directional vector reduces the need to perform a computationally-intensive operation (e.g., pixel-by-pixel analysis of the planar surface) to determine the normal vector. Reducing the need to perform computationally-intensive normal estimation operations tends to enhance an operability of a battery-operated device by extending a battery life of the battery-operated device. Reducing a number of computationally-intensive normal estimation operations tends to improve an operational efficiency of a device by reducing an amount of heat that the device generates.

Figure 5:
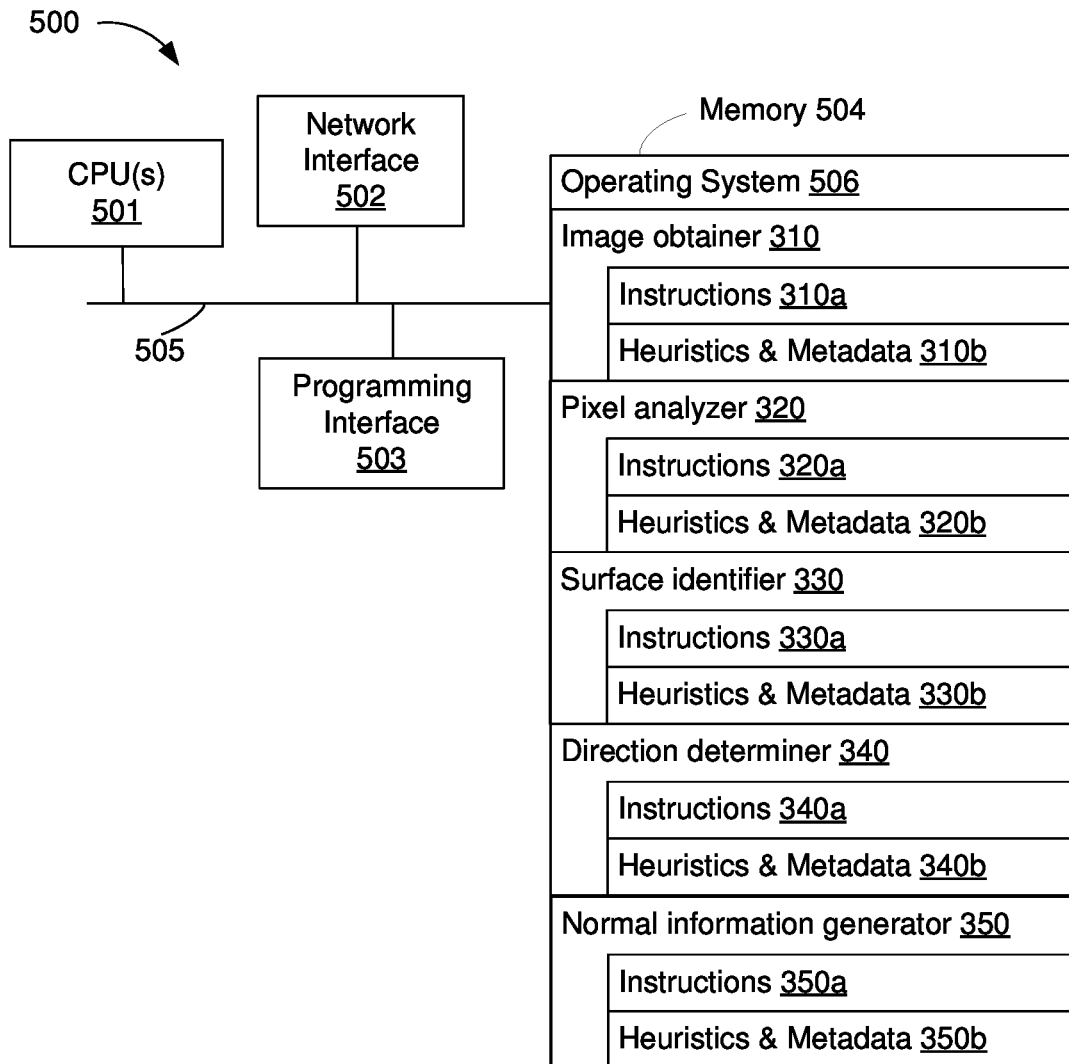
FIG. 5 is a block diagram of a device in accordance with some implementations.

FIG. 5 is a block diagram of a server system 500 enabled with one or more components of a device (e.g., the electronic device 102 and/or the controller 104 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish, and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the image obtainer 310, the pixel analyzer 320, the surface identifier 330, the direction determiner 340, and/or the normal information generator 350. As described herein, the image obtainer 310 may include instructions 310a and/or heuristics and metadata 310b for obtaining an image. As described herein, the pixel analyzer 320 may include instructions 320a and/or heuristics and metadata 320b for determining correspondences between pixels in the obtained image and features in a physical environment, such as objects or spatial lines. As described herein, the surface identifier 330 may include instructions 330a and/or heuristics and metadata 330b for identifying planar surfaces in the physical environment. As described herein, the direction determiner 340 may include instructions 340a and/or heuristics and metadata 340b for determining a directional measurement, such as a gravity measurement or a gravity vector, for example, based on the obtained image or based on measurements from an IMU. As described herein, the normal information generator 350 may include instructions 350a and/or heuristics and metadata 350b for generating (e.g., estimating) normal information, such as a normal vector to a planar surface, based on an orientation of the planar surface and the directional vector.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
        identifying planar surfaces in an environment represented by an image, wherein each planar surface is associated with a respective orientation;
        determining a gravity vector indicating a direction of gravity;
        identifying a subset of the planar surfaces that have a threshold orientation relative to the gravity vector; and
        for each planar surface in the subset of the planar surfaces, determining a normal vector for the planar surface based on the orientation of the planar surface and the gravity vector.

2. The method of claim 1, further comprising obtaining the image, wherein the image comprises a plurality of pixels.

3. The method of claim 2, further comprising receiving the image from an image sensor.

4. The method of claim 1, wherein the planar surfaces are associated with a physical article in the environment.

5. The method of claim 4, wherein each planar surface is associated with a point on the physical article.

6. The method of claim 5, further comprising detecting the point using a depth sensor.

7. The method of claim 1, further comprising detecting the respective orientation associated with each planar surface.

8. The method of claim 1, wherein determining the gravity vector comprises:
    determining a gravity measurement; and
    synthesizing the gravity vector based on the gravity measurement.

9. The method of claim 1, wherein the device comprises an inertial measurement unit (IMU).

10. The method of claim 9, further comprising obtaining the gravity vector from the IMU.

11. The method of claim 1, wherein determining the gravity vector comprises determining the gravity vector based on an orientation of a physical article in the environment.

12. The method of claim 11, wherein the physical article is represented by a set of pixels in the image.

13. The method of claim 1, wherein determining the gravity vector comprises determining the gravity vector based on a set of pixels in the image.

14. The method of claim 13, wherein the set of pixels represents a spatial line in the environment.

15. The method of claim 1, wherein the threshold orientation is parallel to the gravity vector.

16. The method of claim 1, wherein the threshold orientation is orthogonal to the gravity vector.

17. A device comprising:
    one or more processors;
    a non-transitory memory; and
    one or more programs stored in the non-transitory memory, which, when executed by the one or more processors, cause the device to:
        identify planar surfaces in an environment represented by an image, wherein each planar surface is associated with a respective orientation;
        determine a gravity vector indicating a direction of gravity;

identify a subset of the planar surfaces that have a threshold orientation relative to the gravity vector; and for each planar surface in the subset of the planar surfaces, determine a normal vector for the planar surface based on the orientation of the planar surface and the gravity vector.

18. The device of claim 17, wherein determining the gravity vector comprises:
   determining a gravity measurement; and
   synthesizing the gravity vector based on the gravity measurement.

19. The device of claim 17, wherein determining the gravity vector comprises determining the gravity vector based on an orientation of a physical article in the environment.

20. The device of claim 17, wherein the threshold orientation is parallel to the gravity vector.

21. A non-transitory memory storing one or more programs, which, when executed by one or more processors of a device, cause the device to:

identify planar surfaces in an environment represented by an image, wherein each planar surface is associated with a respective orientation;

determine a gravity vector indicating a direction of gravity;

identify a subset of the planar surfaces that have a threshold orientation relative to the gravity vector; and for each planar surface in the subset of the planar surfaces, determine a normal vector for the planar surface based on the orientation of the planar surface and the gravity vector.

22. The non-transitory memory of claim 21, wherein the device comprises an inertial measurement unit (IMU) and determining the gravity vector comprises obtaining the gravity vector from the IMU.

23. The non-transitory memory of claim 21, wherein determining the gravity vector comprises determining the gravity vector based on a set of pixels in the image.

24. The non-transitory memory of claim 21, wherein the threshold orientation is orthogonal to the gravity vector.

* * * * *